Patented Mar. 29, 1932

1,851,872

UNITED STATES PATENT OFFICE

HERMANN SCHREIBER, OF HAMBURG, GERMANY, ASSIGNOR TO THE FIRM: C. H. BOEHRINGER SOHN, OF NIEDER-INGELHEIM-ON-THE-RHINE, GERMANY, A SOCIETY OF GERMANY

METHOD FOR OBTAINING THEOBROMINE

No Drawing. Application filed July 18, 1927, Serial No. 206,781, and in Germany April 12, 1926.

This invention relates to the production of theobromine from natural theobromine-containing compounds, e. g. waste products such as tailings of cocoa beans and especially from cocoa shell. The known methods for obtaining theobromine from cocoa shell and similar products amount in the main to the extraction of the theobromine from the ground shell or products by means of organic solvents.

According to the process of the present invention good yields of theobromine are obtained by treating a theobromine-containing compound such as cocoa shell with water in presence of an alkaline earth hydroxide at the ordinary or only slightly raised temperature and working up the alkaline earth salts of theobromine so obtained by the usual methods.

The alkaline earth hydroxides are suitably employed in large excess over the theobromine content of the originating material. The quantity of water amounts to a multiple of the quantity of the theobromine-containing material, such as cocoa shell, to be worked up. The temperatures should not substantially exceed 50–60° C.: In general it is sufficient to work at ordinary temperature that is, substantially 25° C.

In carrying out the process, one method is to well mix, for example by stirring, the comminuted, if necessary finely ground cocoa, with excess of alkaline earth hydroxide, especially with lime and water, and, after converting the free theobromine, as well as that present as the glucoside, into calcium theobromide, to separate the solution from the solid residue, for example by filtration, and to work the former up for theobromine.

The theobromine can be recovered from the aqueous solution of the calcium theobromide for example by acidifying with mineral acids or by passing in carbon dioxide and the like, if necessary in such a way that the carbon dioxide is passed in after the solution has been suitably concentrated, when the theobromine is precipitated together with calcium hydroxide, from which it can be purified by treatment with acids forming soluble calcium salts, such as hydrochloric acid.

A specially efficacious method of carrying out the invention is to extract the waste products containing theobromine, especially cocoa shell, without previously breaking up, or breaking up into coarse lumps in suitable extraction apparatus, e. g. diffusers, with milk of lime, lime water or the like, preferably at ordinary or only slightly raised temperature, suitably by the counter-current principle. It has been established that by this method even when using unbroken or coarsely broken shell it is possible to obtain practically the whole of the theobromine.

In this way the method offers the great advantage that the difficult fine grinding process can be dispensed with, that the difficult filtration methods are eliminated and that concentrated solutions of calcium theobromide can be at once obtained, so that the costly concentration of the dilute solution is avoided.

The extraction of the theobromine with water and alkaline earth hydroxides can be preceded, if desired, by a fat removal, with the aid of organic fat solvents by the usual methods; this, however, is not absolutely necessary.

By acidifying the extracts with mineral acids, passing in carbon dioxide and the like methods the theobromine is obtained in an excellent state of purity.

Example

Cocoa shells are freed from fat according to the usual methods with organic solvents, e. g. benzol or benzine. The residue freed from the solvent is treated in a diffusion battery with milk of lime until a concentrated solution of theobromine is obtained. The extract is acidified with hydrochloric acid when the theobromine contained therein separates out in a pure form. By evaporating the mother liquor a further quantity of theobromine can be obtained in a less pure condition. Other alkaline earth hydroxides with suitable quantities of water can be used in place of milk of lime.

What I claim is:—

1. Method of obtaining theobromine from natural substances containing theobromine comprising cocoa waste products, which consists of the steps of mixing said cocoa waste products with water and an excess of an alkaline earth hydroxide, heating said mixture to a temperature lying between 25° C. and 60° C., separating the resulting aqueous solution of the alkaline earth salt of the theobromine from the insoluble residue, and working up the aqueous solution of the alkaline earth salt so obtained into theobromine.

2. Method of obtaining theobromine comprising the steps of mixing coarsely broken cocoa shells with water and an excess of alkaline earth hydroxide, heating said mixture to a temperature lying between 25° C. and 60° C., separating the resulting aqueous solution of the alkaline earth salt of the theobromine from the insoluble residue, and working up the aqueous solution of the alkaline earth salt so obtained into theobromine.

3. Process as claimed in claim 1 wherein the cocoa waste products are passed in counter current relation with milk of lime while simultaneously agitated.

4. Process as claimed in claim 2 wherein the fat is removed from the cocoa shells before treatment with the alkaline earth hydroxide and water.

In testimony whereof I affix my signature.

HERMANN SCHREIBER.